United States Patent [19]

Cheney et al.

[11] Patent Number: 5,668,599

[45] Date of Patent: Sep. 16, 1997

[54] MEMORY MANAGEMENT FOR AN MPEG2 COMPLIANT DECODER

[75] Inventors: Dennis Phillip Cheney, Vestal; Mark Louis Ciacelli; Steven Bradford Herndon, both of Endicott; John David Myers; Chuck Hong Ngai, both of Endwell, all of N.Y.

[73] Assignee: International Business Machines Corporation, Armonk, N.Y.

[21] Appl. No.: 618,660

[22] Filed: Mar. 19, 1996

[51] Int. Cl.⁶ ......................................... H04N 7/12
[52] U.S. Cl. ..................... 348/402; 348/409; 348/415; 348/416
[58] Field of Search .................... 348/402, 409, 348/415, 416, 399; 370/60; H04N 7/12

[56] References Cited

U.S. PATENT DOCUMENTS

| | | |
|---|---|---|
| 5,014,265 | 5/1991 | Hahne et al. .......................... 370/60 |
| 5,134,477 | 7/1992 | Knauer et al. ......................... 358/136 |
| 5,220,425 | 6/1993 | Enari et al. ............................ 358/160 |
| 5,278,647 | 1/1994 | Hingorani et al. ..................... 358/136 |
| 5,293,229 | 3/1994 | Iu ........................................... 348/415 |
| 5,317,397 | 5/1994 | Odaka et al. .......................... 348/416 |
| 5,361,097 | 11/1994 | Kolczynski ............................ 348/390 |
| 5,386,234 | 1/1995 | Veltman et al. ....................... 348/415 |
| 5,398,072 | 3/1995 | Auld ...................................... 348/426 |
| 5,410,354 | 4/1995 | Uz .......................................... 348/426 |
| 5,461,679 | 10/1995 | Normile et al. ....................... 382/304 |
| 5,534,928 | 7/1996 | Iwamura ................................ 348/409 |

*Primary Examiner*—Tommy P. Chin
*Assistant Examiner*—Luanne P. Dion
*Attorney, Agent, or Firm*—Richard M. Goldman

[57] ABSTRACT

Disclosed is a digital signal decoder system for receiving compressed encoded digitized video signals and transmitting decompressed decoded digital video signals. This is accomplished with a minimum of DRAM demand through the use of a Spill Buffer.

12 Claims, 16 Drawing Sheets

MEMORY ADDRESS POINTER CONTROL FOR 3 BUFFERS

| | PICTURE TYPE | CURRENT | PAST | FUTURE | DISPLAY | TEMPORARY |
|---|---|---|---|---|---|---|
| INITIAL VALUES | P | 0 | 1 | 0 | 1 | 2 |
| 1 | I | 2 | 0 | 2 | 0 | 1 |
| 6 | P | 1 | 2 | 1 | 2 | 0 |
| 2 | B | 0 | 2 | 1 | 0 | 2 |
| 3 | B | 0 | 2 | 1 | 0 | 0 |
| 4 | B | 0 | 2 | 1 | 0 | 0 |
| 5 | B | 0 | 2 | 1 | 0 | 0 |
| 7 | P | 2 | 1 | 2 | 1 | 0 |
| 8 | I | 0 | 2 | 0 | 2 | 1 |
| 9 | P | 1 | 0 | 1 | 0 | 2 |
| 10 | P | 2 | 1 | 2 | 1 | 0 |
| 13 | P | 0 | 2 | 0 | 2 | 1 |
| 11 | B | 1 | 2 | 0 | 1 | 2 |
| 12 | B | 1 | 2 | 0 | 1 | 1 |
| 16 | P | 2 | 0 | 2 | 0 | 1 |
| 14 | B | 1 | 0 | 2 | 1 | 0 |
| 15 | B | 1 | 0 | 2 | 1 | 1 |

C = D∗NBF + ¬NBF∗(T∗(PREV¬=B) + P∗(PREV=B ∗ PRES¬=B))

P = C∗NBF + ¬NBF∗F∗(PRES¬=B)

F = T∗(PREV¬=B ∗ PRES=¬B) + P∗(PREV=B ∗ PRES¬=B)

D = C∗NBF + ¬NBF∗(F∗(PRES¬=B) + T∗(PREV¬=B ∗ PRES=B))

T = D

TE: C = CURRENT PICTURE POINTER
P = PAST PICTURE POINTER
F = FUTURE PICTURE POINTER
D = DISPLAY PICTURE POINTER
T = TEMPORARY POINTER
PRES = PRESENT PICTURE TYPE
PREV = PREVIOUS PICTURE TYPE
NBF = NO B FRAME MODE

DISCRETE COSINE TRANSFORM
$$y_{kl} = \frac{c(k)c(l)}{4} \sum_{i=0}^{\frac{n}{2}} \sum_{j=0}^{\frac{n}{2}} x_{ij} \cos\left(\frac{(2i+1)k\pi}{16}\right) \cos\left(\frac{(2j+1)l\pi}{16}\right)$$
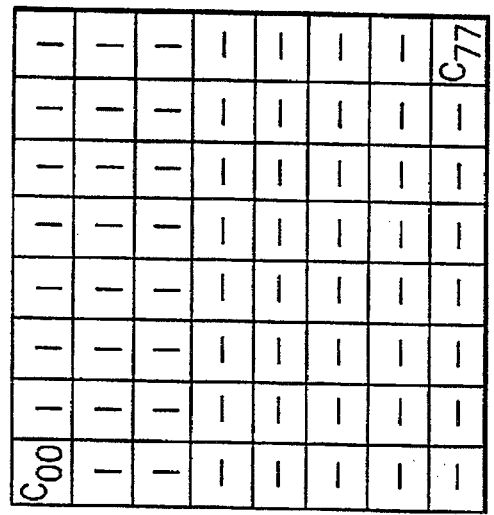
COEFFICIENTS
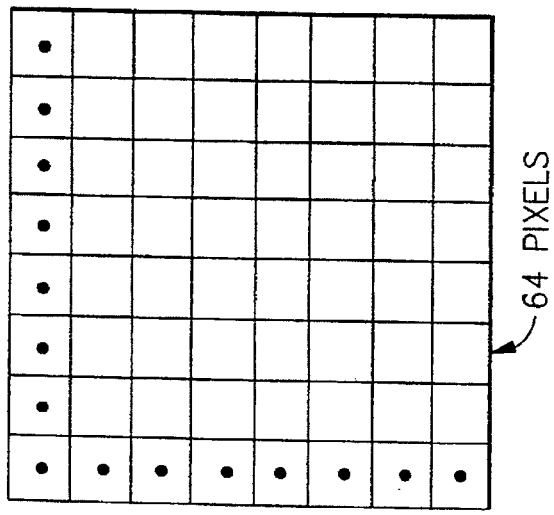
64 PIXELS
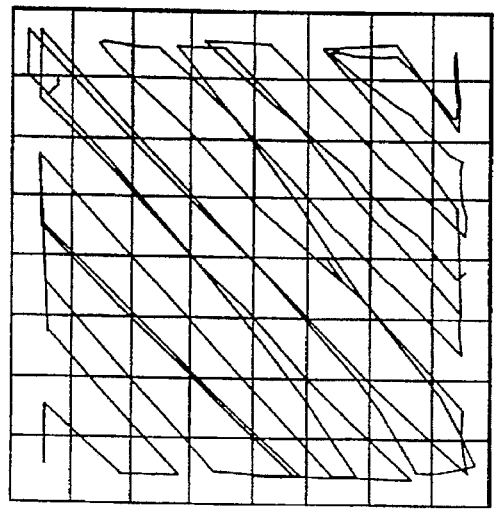
QUANTIZE, "ZIG ZAG"
0001101011 0011
QUANTIZED, ZIG ZAGGED
COEFFICIENT LOST SYSTEM
FIG. 2

MEMORY ADDRESS POINTER CONTROL FOR 3 BUFFERS

| | PICTURE TYPE | CURRENT | PAST | FUTURE | DISPLAY | TEMPORARY |
|---|---|---|---|---|---|---|
| INITIAL VALUES | P | 0 | 1 | 0 | 1 | 2 |
| 1 | I | 2 | 0 | 2 | 0 | 1 |
| 6 | P | 1 | 2 | 1 | 2 | 0 |
| 2 | B | 0 | 2 | 1 | 0 | 2 |
| 3 | B | 0 | 2 | 1 | 0 | 0 |
| 4 | B | 0 | 2 | 1 | 0 | 0 |
| 5 | B | 0 | 2 | 1 | 0 | 0 |
| 7 | P | 2 | 1 | 2 | 1 | 0 |
| 8 | I | 0 | 2 | 0 | 2 | 1 |
| 9 | P | 1 | 0 | 1 | 0 | 2 |
| 10 | P | 2 | 1 | 2 | 1 | 0 |
| 13 | P | 0 | 2 | 0 | 2 | 1 |
| 11 | B | 1 | 2 | 0 | 1 | 2 |
| 12 | B | 1 | 2 | 0 | 1 | 1 |
| 16 | P | 2 | 0 | 2 | 0 | 1 |
| 14 | B | 1 | 0 | 2 | 1 | 0 |
| 15 | B | 1 | 0 | 2 | 1 | 1 |

$C = D*NBF + \neg NBF*(T*(PREV \neq B) + P*(PREV=B * PRES \neq B))$ $P = C*NBF + \neg NBF*F*(PRES \neq B)$ $F = T*(PREV \neq B * PRES = \neg B) + P*(PREV=B * PRES \neq B)$ $D = C*NBF + \neg NBF*(F*(PRES \neq B) + T*(PREV \neq B * PRES = B))$ $T = D$ TE: C   = CURRENT PICTURE POINTER
    P   = PAST PICTURE POINTER
    F   = FUTURE PICTURE POINTER
    D   = DISPLAY PICTURE POINTER
    T   = TEMPORARY POINTER
    PRES = PRESENT PICTURE TYPE
    PREV = PREVIOUS PICTURE TYPE
    NBF = NO B FRAME MODE

FIG.10

|  | NORMAL MODE (HEX ADR) | LOW DELAY MODE (HEX ADR) |
|---|---|---|
| USER ORG ---> USER DATA BUFFER | 0 | 0 |
| OSD ORG ---> OSD BUFFER | 200 | 200 |
| Y0 ORG ---> BUFFER 0 LUMA | BA00 | BA00 |
| UV0 ORG ---> BUFFER 0 CHROMA | 60000 | 60000 |
| Y1 ORG ---> BUFFER 1 LUMA | 8A300 | BA00 |
| UV1 ORG ---> BUFFER 1 CHROMA | DE900 | 60000 |
| Y2 ---> BUFFER 2 LUMA | 108C00 | BA00 |
| UV2 ORG ---> BUFFER 2 CHROMA | 15D200 | 60000 |
| Y-SPILL ORG ---> SPILL BUFFER LUMA | 187500 | BA00 |
| UV-SPILL ORG ---> SPILL BUFFER CHROMA | 192900 | B7300 |
| DATA ORG ---> COMPRESSED DATA BUFFER | 198300 | CDB00 |

FIG. 11

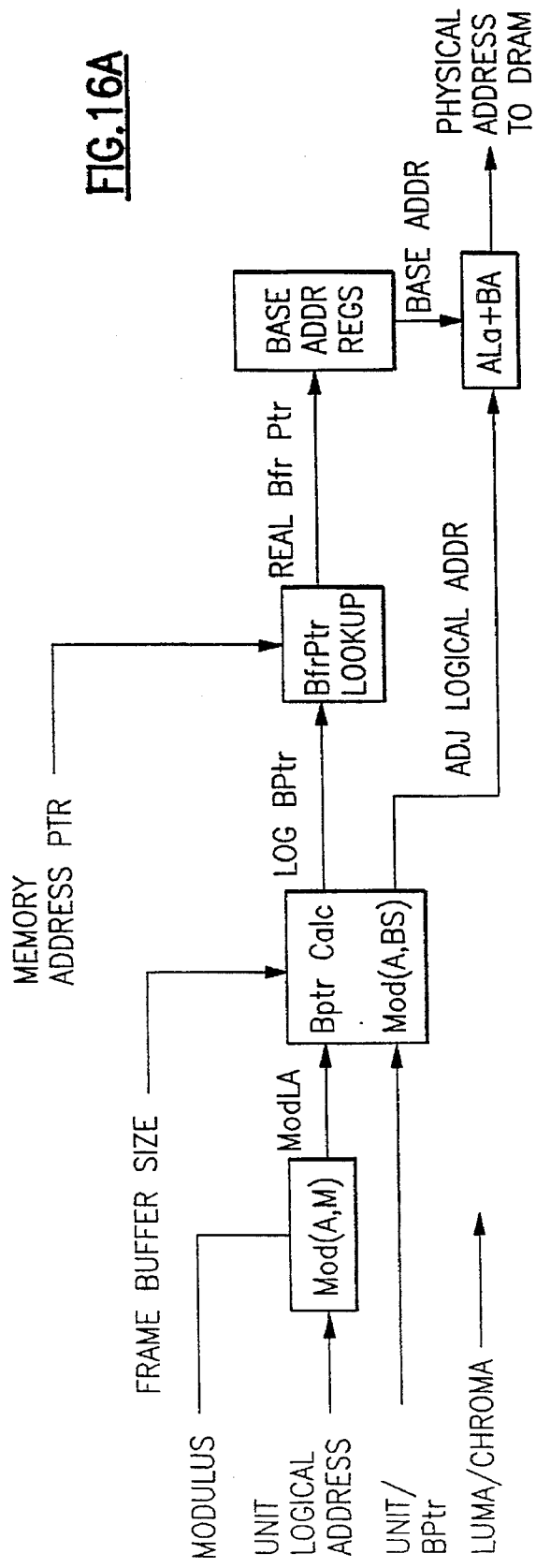

FIG.16A

FUNCTION:

UNIT/Bptr — THIS IS THE FUNCTIONAL UNIT (SUCH AS MOTION COMP) WHICH IS ACCESSING THE DRAM. THE UNIT WILL ALSO INDICATE WHICH BUFFER SHOULD BE ACCESSED — THE CURRENT, PAST OR FUTURE BUFFER. (THE SPILL BUFFER IS SELECTED INDIRECTLY BY THE ADDRESSES PROVIDED AND THE CALCULATIONS AS DESCRIBED BELOW). A LUMA/CHROMA BIT IS ALSO INPUT AND IS USED TO ADJUST THE CALCULATIONS AND LOOKUP TABLES. FOR 4:2:0, THE CHROMA BUFFERS ARE 1/2 THE SIZE OF THE LUMA BUFFERS.

UNIT LOGICAL ADDRESS — THE ADDRESS SENT BY THE FUNCTIONAL UNIT.

MODULO LA — THE MODULUS OF THE ADDRESS IS CALCULATED VERSUS THE TOTAL BUFFER SIZE WHICH IS THE SUM OF THE FRAME BUFFER SIZE AND SPILL BUFFER SIZE.

Adj LA — THIS IS THE ADJUSTED LOGICAL ADDRESS AFTER A CHECK IS MADE TO SEE IF THE MODULO LOGICAL ADDRESS IS GREATER THAN THE FRAME SIZE. THE LOGICAL BUFFER POINTER IS SELECTED BASED ON THE UNIT BEING ACCESSED OR THE SPILL BUFFER IS SELECTED. IF THE MODULO LOGICAL ADDRESS IS GREATER THAN THE FRAME SIZE, THE SPILL BUFFER IS SELECTED AS THE LOGICAL BUFFER POINTER.

LOG BPtr — LOGICAL BUFFER POINTER. THIS IS EITHER THE INPUT BUFFER POINTER OR THE SPILL BUFFER POINTER DEPENDING ON THE RESULT OF THE ADJUSTED LA CALCULATION ABOVE.

REAL BPtr — THE LOGICAL BUFFER POINTER IS CONVERTED TO A REAL BUFFER POINTER BY USING THE MEMORY ADDRESS POINTER INPUT AS A LOOKUP TABLE.

BASE ADDR REGS — THIS TABLE PROVIDES A BASE ADDRESS AS A FUNCTION OF THE REAL BPtr.

PHYSICAL ADDR — THIS FINAL ADDRESS IS GENERATED BY ADDING THE ADJUSTED TO DRAM LOGICAL ADDRESS TO BASE ADDRESS.

FIG.16B

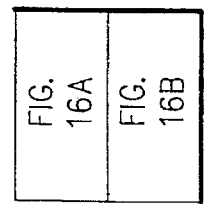

FIG.16

MEMORY MANAGEMENT FOR AN MPEG2 COMPLIANT DECODER

FIELD OF THE INVENTION

This invention relates to video decoders, especially video decoders intended to decode and decompress compressed encoded video signals, e.g., discrete cosine transform encoded video signals. The method and apparatus of the invention are characterized by a low memory buffer requirement for decoding. This is made possible by the use of memory buffer management and a Spill Buffer. The method, apparatus, and system of the invention are useful in decoding broadcast signals, cablecast signals, satellite broadcast signals, and digital network signals, as well as high definition television, interactive television, multimedia, video on demand, video conferencing, and digital video recording. The system and apparatus of the invention may be a "stand alone" unit, as a set top box or a digital entertainment terminal, or the like, as a component of a television set, a personal computer, work station, or other computer, as a unit contained on one or more printed circuit boards, or as part of a video recorder or dedicated teleconferencing unit.

BACKGROUND OF THE INVENTION

The Moving Picture Experts' Group (MPEG) MPEG-2 Standard is a compression/decompression standard for video applications. The standard describes an encoded and compressed datastream that has substantial bandwidth reduction. The compression is a subjective loss compression followed by a lossless compression. The encoded, compressed digital video data is subsequently decompressed and decoded in an MPEG-2 Standard compliant decoder.

The MPEG-2 Standard is described in, e.g., C. A. Gonzales and E. Viscito, "Motion Video Adaptive Quantization In The Transform Domain," IEEE Trans Circuits Syst Video Technol, Volume 1, No. 4, Dec. 1991, pp. 374–378, E. Viscito and C. A. Gonzales, "Encoding of Motion Video Sequences for the MPEG Environment Using Arithmetic Coding," SPIE, Vol. 1360, pp. 1572–1576, (1990), D. LeGall, "MPEG: A Video Compression Standard for Multimedia Applications," Communications of the ACM, Vol. 34, No. 4, (April 1991), pp. 46–58, S. Purcell and D. Galbi, "C Cube MPEG Video Processor," SPIE, v. 1659, (1992) pp. 24–29, and D. J. LeGall, "MPEG Video Compression Algorithm," Signal Process Image Commun, v. 4, n. 2, (1992), pp. 129–140, among others.

The MPEG-2 Standard specifies a datastream from and a decoder for a very high compression technique that achieves overall image datastream compression not achievable with either intraframe coding alone or interframe coding alone, while preserving the random access advantages of pure intraframe coding. The combination of block based frequency domain intraframe encoding and interpolative/predictive interframe encoding of the MPEG-2 Standard result in a balance between intraframe encoding alone and interframe encoding alone.

The MPEG-2 Standard exploits temporal redundancy for motion compensated interpolative and predictive encoding. That is, the assumption is made that "locally" the current picture can be modeled as a translation of the picture at a previous and/or future time. "Locally" means that the amplitude and direction of the displacement are not the same everywhere in the picture.

The MPEG-2 Standard specifies predictive and interpolative interframe encoding and frequency domain intraframe encoding. It has block based motion compensation for the reduction of temporal redundancy, and block based Discrete Cosine Transform based compression for the reduction of spatial redundancy. Under the MPEG-2 Standard motion compensation is achieved by predictive coding, interpolative coding, and Variable Length Coded motion vectors. The information relative to motion is based on a 16×16 array of pixels and is transmitted with the spatial information. Motion information is compressed with Variable Length Codes, such as Huffman codes.

The MPEG-2 Standard provides temporal redundancy reduction through the use of various predictive and interpolative tools. This is illustrated in FIG. 1. FIG. 1 shows three types of frames or pictures, "I" Intrapictures, "P" Predicted Pictures, and "B" Bidirectional Interpolated Pictures. Note that for interframe encoding, as IP and IPB encoding, picture transmission order is not the same as picture display order.

Motion compensation goes to the redundancy between pictures. The formation of P Predicted Pictures from I Intrapictures and of B Bidirectional Coded Pictures from a pair of past and future pictures is a key feature of the MPEG-2 Standard technique.

The "I" Intrapictures provide moderate compression, and are access points for random access, e.g., in the case of video tapes or CD ROMS. As a matter of convenience, one "I" Intrapicture is provided approximately every half second that is, every ten to twenty pictures. The "I" Intrapicture only gets information from itself. It does not receive information from an "P" Predicted Picture or "B" Bidirectional Interpolated Picture. Scene cuts preferably occur at "I" Intrapictures.

"P" Predicted Pictures are coded with respect to a previous picture. "P" Predicted Pictures are used as the reference for future pictures, both "P" and "B" pictures.

"B" Bidirectional Coded pictures have the highest degree of compression. They require both a past picture and a future picture for reconstruction. "B" bidirectional pictures are never used as a reference.

The motion compensation unit under the MPEG-2 Standard is the Macroblock unit. The MPEG-2 Standard Macroblocks are 16×16 pixels. Motion information consists of one vector for forward predicted macroblocks, one vector for backward predicted macroblocks, and two vectors for bidirectionally predicted macroblocks. The motion information associated with each macroblock is coded differentially with respect to the motion information present in the reference macroblock. In this way a macroblock of pixels is predicted by a translation of a macroblock of pixels from a past or future picture.

The difference between the source pixels and the predicted pixels is included in the corresponding bit stream. The decoder adds a correction term to the block of predicted pixels to produce the reconstructed block.

As described above and illustrated in FIG. 1, each macroblock of a "P" Predicted Picture can be coded with respect to the closest previous "I" Intrapicture, or with respect to the closest previous "P" Predicted Picture.

Further, as described above and illustrated in FIG. 1, each macroblock of a "B" Bidirectional Picture can be coded by forward prediction from the closest past "I" or "P" Picture, by backward prediction from the closest future "I" or "P" Picture, or bidirectionally, using both the closest past "I" or "P" picture and the closest "future "I" or "P" picture. Full bidirectional prediction is the least noisy prediction.

Motion information is sent with each macroblock to show what part of the reference picture is to be used as a predictor.

As noted above, motion vectors are coded differentially with respect to motion vectors of the previous adjacent block. Variable Length Coding is used to code the differential motion vector so that only a small number of bits are needed to code the motion vector in the common case, where the motion vector for a macroblock is nearly equal to the motion vector for a preceding macroblock.

Spatial redundancy is the redundancy within a picture. Because of the macroblock based nature of the motion compensation process, described above, it was desirable for the MPEG-2 Standard to use a block based method of reducing spatial redundancy. The method of choice is the Discrete Cosine Transformation, and Discrete Cosine Transform coding of the picture. Discrete Cosine Transform coding is combined with weighted scalar quantization and run length coding to achieve still further levels of compression.

The Discrete Cosine Transformation is an orthogonal transformation. Orthogonal transformations, because they have a frequency domain interpretation, are filter bank oriented. The Discrete Cosine Transformation is also localized. That is, the encoding process samples on an 8×8 spatial window which is sufficient to compute 64 transform coefficients or sub-bands.

Another advantage of the Discrete Cosine Transformation is that fast encoding and decoding algorithms are available. Additionally, the sub-band decomposition of the Discrete Cosine Transformation is sufficiently well behaved to allow effective use of psychovisual criteria.

After Discrete Cosine transformation, many of the higher frequency coefficients are zero. These coefficients are organized into a zig-zag, as shown in FIG. 2, and converted into run-amplitude (run-level) pairs. Each pair indicates the number of zero coefficients and the amplitude of the non-zero coefficient. This is coded in a Variable Length Code.

Discrete Cosine Transformation encoding is carried out in the three stages as shown in FIG. 2. The first stage is the computation of the Discrete Cosine Transformation coefficients. The second step is the quantization of the coefficients. The third step is the conversion of the quantized transform coefficients into {run-amplitude} pairs after reorganization of the data into zig-zag scanning order.

Quantization can be viewed as a shift right by several bits. Quantization enables very high degrees of compression, and a high output bit rate, and retains high picture quality.

Quantization can be adaptive, with "I" Intrapictures having fine quantization to avoid "blockiness" in the reconstructed image. This is important because "I" Intrapictures contain energy at all frequencies. By way of contrast, "P" and "B" pictures contain predominantly high frequency energy and can be coded at a coarser quantization.

One challenge facing decoder designers is the accommodation of a single decoder system to a variety of display output formats, while complying fully with luminance/chrominance relationships and the MPEG2 standard.

The displayed output of the decoder chip must conform to CCIR recommendation 601. This specifies the number of luminance and chrominance pixels in a single active line, and also how the chrominance pixels are subsampled relative to the luminance signals. The format defined as 4:2:2 is supported in most cases in the industry. This defines 720 active luminance signals (Y), and 360 color difference signals (Cb, Cr pairs), where each line of luminance signals has corresponding line of chrominance signals. CCIR recommendation 656 goes on to define the number of active lines for NTSC and PAL environments as 480 and 576, respectively.

The output of the decoder chip is decoded digital video information which is stored in the external memory area in frame buffers. In order to properly decode and display the digital video information, four frame buffers have heretofore been required:

The Decompression Frame (currently being decoded),

The Past Reference Frame,

The Future Reference Frame, and

The Display Frame (currently being displayed).

Each buffer must be large enough to hold a complete picture's worth of digital video data (720×480 pixels for MPEG-2 Main Profile/Main Level). In order to keep the cost of the video decoder products down, an important goal has been to reduce the amount of external memory required to support the decode function. The MPEG-2 decoder function can operate with 1 Megabyte, 2 Megabyte, and 4 Megabyte DRAM configurations. However, it is desirable to reduce the required amount of DRAM.

It is desirable to switch between sequences that are of different size resolution seamlessly, without introducing unwanted noise or delay. Noise can be introduced by reallocating memory before the last picture of prior sequence is played. Delay would occur if reallocation occurs after the last picture of the prior sequence is played.

OBJECTS OF THE INVENTION

It is one objective of the invention to provide a system that maintains and even increases the speed of the decoding process.

It is a further objective of the invention to allow the decoder to operate with the smallest possible memory in the range of 1 to 4 Megabytes of DRAM. This is due to current availability of DRAM sizes and costs.

It is a still further objective of the invention to allow the decoder to perform seamless sequence switching.

SUMMARY OF THE INVENTION

These and other objectives of the invention are attained by the digital video decoder system of the invention. This invention describes a means to accomplish these objectives by efficient use of the frame buffers and, in some cases, re-use of selected buffers. The required number of frame buffers is reduced to a maximum of three with certain functional modes capable of operating with less than two.

The system is useful for receiving encoded compressed digital video signals from a network or host and transmitting decoded digital video signals to an output display. The elements of the decoder system include a FIFO data buffer, a variable length code decoder, a dequantizer, a discrete cosine transform inverter, a motion compensator, a display unit video output, and a controller.

The FIFO Data Buffer receives compressed, encoded, digital video data from a cablecast, satellite, or telecast network, another network, a host or an upstream apparatus or system, and temporarily stores the data, before transfer to memory.

The system also includes a random access memory (RAM). The RAM, which may be a SRAM, a DRAM, or a set of latches, serves two purposes. The RAM receives the compressed, encoded digital data for storage in a compressed, encoded Data Buffer that is connected to the FIFO Data Buffer. This portion of the RAM, which may be a separate integrated circuit chip or chips, or incorporated into a single integrated circuit chip or chips, or main memory, is adapted to receive and store encoded compressed digital video data from the FIFO. The RAM also includes a data portion for storing decoded decompressed digital video pictures. A Memory Management Unit is provided for managing the RAM.

The system includes a Variable Length Code Decoder, e.g., a Huffman decoder, for receiving encoded compressed data from the RAM. This data is received from the compressed, encoded Data Buffer portion of the RAM. The Variable Length Code Decoder provides a decoded bit stream for further processing.

The system next includes an Inverse Quantizer for dequantizing the decoded data from the Variable Length Code Decoder. To be noted is that the quantization factor is an element of the incoming bitstream.

The system includes an Inverse Discrete Cosine Transform Decoder for transforming the dequantized, decoded data from the Inverse Quantizer from the frequency domain to the spatial domain in blocks of 8×8 pixel units.

The system also includes a Motion Compensator for receiving Intrapictures and other information from the RAM, and error functions from the Inverse Discrete Cosine Transform Decoder, and forming motion compensated Predicted and Bidirectional Pictures therefrom for return to the RAM.

The output of the system is through a Display Unit including means to convert the output to the format or aspect ratio of the output display drive. The Display Unit provides an output of decoded, decompressed, motion compensated pictures from the RAM.

The individual elements of the unit are under the control of a Controller. The Controller, for example, a Reduced Instruction Set Controller, with f-modulo add capability, controls the Memory Management Unit, the Variable Length Code Decoder, the Inverse Quantizer, the Inverse Discrete Cosine Transform Decoder, the Motion Compensator, and the Display Unit.

The MPEG-2 Video Decoder chip takes, as input, digital video information that has been encoded according to the MPEG-2 Standard, The output of the decoder chip is decoded digital video information which is stored in the external memory area in frame buffers. In order to properly decode and display the digital video information, there are four frame buffers required:

The Decompression Frame (currently being decoded),
The Past Reference Frame,
The Future Reference Frame, and
The Display Frame (currently being displayed).

Each buffer must be large enough to hold a complete picture's worth of digital video data (720×480 pixels for MPEG-2 Main Profile/Main Level).

In order to keep the cost of the video decoder products down, an important aspect of the invention is reducing the amount of external memory required to support the decode function. The MPEG-2 decoder function can operate with 1 Megabyte, 2 Megabyte, and 4 Megabyte DRAM configurations. Allowing the decoder to operate with the smallest possible memory is especially advantageous in these ranges due to current availability of DRAM sizes and costs. This invention describes a means to accomplish that by efficient use of the frame buffers and, in some cases, re-use of selected buffers. The required number of frame buffers is reduced to a maximum of three frame buffers with certain functional modes capable of operating with less than two frame buffers.

The system can work with various downstream video elements, such as a digital computer, a television set, a recorder, or a network. The video decoder can be in combination with an audio decoder, separated therefrom by a suitable demultiplexer.

The decoder system of the invention can be included in a stand-alone system, as a separate accessory, that is, a "set top box." Alternatively, the decoder of the system can be integrally incorporated into the television set, computer, or other video device. Thus, the decoder can be integrated with a downstream element such as a digital computer, a television set, a recorder, or a network. In this alternative embodiment the decoder system is incorporated on one or more printed circuit boards in the downstream element.

The system of the invention can be in the form of a digital signal decoder system of a main memory and processor for receiving compressed encoded digital video signals and transmitting decompressed decoded digital video signals. The main memory has (1) a compressed, encoded Data Buffer adapted to receive and store encoded compressed digital video data, and (2) a data portion for storing decompressed digital video buffer, and a Memory Management Unit for managing the RAM. The decoder system can be a single integrated circuit chip having the FIFO Data Buffer, the Variable Length Code Decoder, the Inverse Quantizer, the Inverse Discrete Cosine Transform Decoder, the Motion Compensator, the poly-phase finite impulse response horizontal filter, the Display Unit, and the Controller.

According to a still further embodiment of the invention there is provided a complete digital video and audio entertainment system or a digital video and audio information system including the digital signal decoder system for receiving encoded compressed digital video signals and transmitting decoded decompressed digital video signals, for example to a consumer television set, a teleconferencing unit, a computer, or a redistribution network. The system includes main memory, the FIFO Data Buffer, the Variable Length Code Decoder, the Inverse Quantizer, the Inverse Discrete Cosine Transform Decoder, the Motion Compensator, the Display Unit, the poly-phase finite impulse response horizontal filter, and the Controller, as well as an audio decoder unit and an output unit such as a television set, a recorder, a computer, or a network for rebroadcast.

THE FIGURES

The invention may be further understood by reference to the Figures appended hereto.

FIG. 2 shows the sequence of compressing a frame or picture, including calculating the Discrete Cosine Transform coefficients, contusing the Discrete Cosine Transform coefficients, and "zig-zagging" the quantized Discrete Cosine Transform coefficients.

FIG. 10 is a table showing the initial values, versus picture type, current picture pointer, past picture pointer, future picture pointer, display picture pointer, and temporary picture pointer for the memory address pointer for three buffers according to the method and apparatus of the invention.

FIG. 11 is the physical memory allocation for both the normal mode and the low delay mode for the memory allocation of the invention.

FIG. 16 shows the logic diagram for the simplified logical to physical address generation of the invention.

DETAILED DESCRIPTION OF THE INVENTION

The systems, method, and apparatus of the invention receive encoded, compressed digital video data from a host interface bus, decompress and decode the digital video data, and deliver decompressed, decoded digital video data through a display interface, also referred to herein as a pixel bus. Conversion from digital data to analog data is done externally of the system, although in one embodiment, a digital to analog converter (DAC) can be incorporated into the system downstream of the pixel bus.

In a preferred embodiment of the invention the decoder system complies fully with the Moving Picture Experts Group MPEG-2 Standard Main Profile at the Main Level, as defined in the MPEG documentation. Thus, the system can receive compressed video data at a rate of 15 Mbs/second, and the system can operate at a 40 MHz clock frequency. In the MPEG-2 Standard the data format for the compressed, encoded data is YCbCr (4:2:0).

Figure 3:
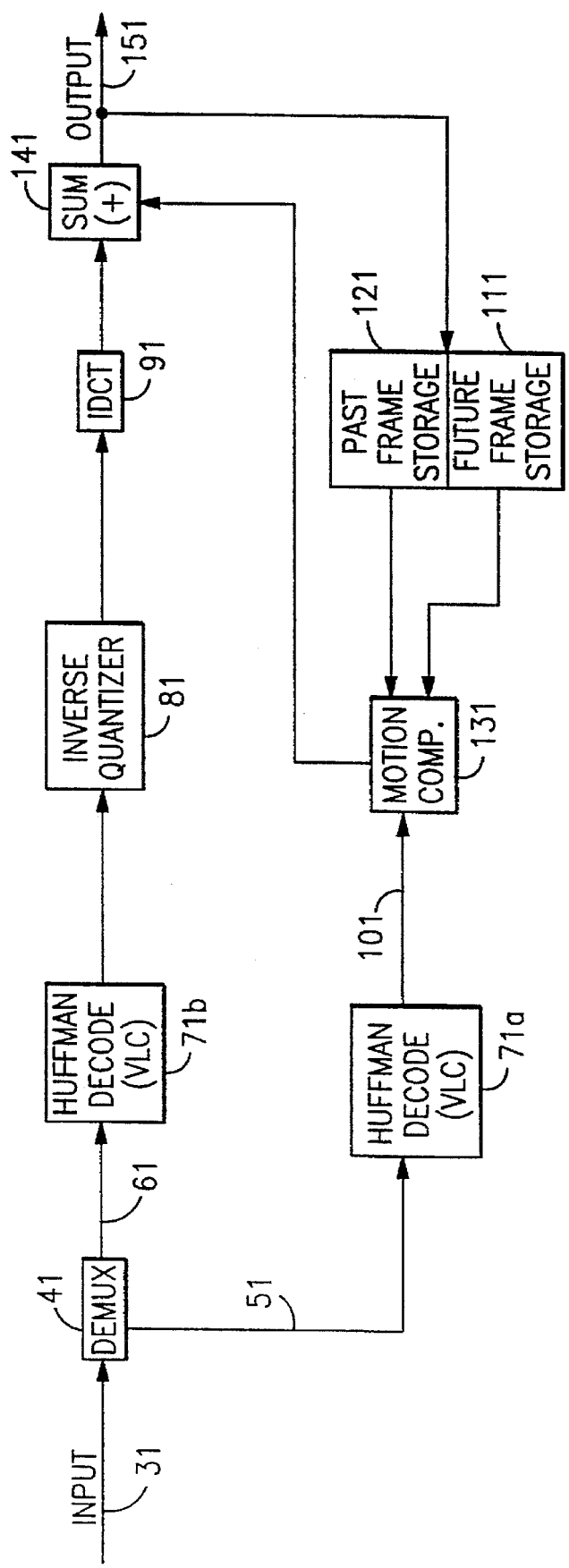
FIG. 3 is a logical flow diagram showing the general logical flow of the MPEG-2 Standard compliant decoder.

FIG. 3 shows the general internal data flow of the system to support the MPEG-2 Standard. Specifically, the compressed, encoded data input 31 goes to a demultiplexer 41 where it is demultiplexed into two streams 51 and 61. Stream 61 goes to a Variable Length Code (VLC) Huffman Decoder 71b for decoding, and to an Inverse Quantizer 81 for dequantizing. The dequantized code then goes to an Inverse Discrete Cosine Transform (IDCT) process 91, where the dequantized code is transformed into a pixel mapping.

The second data stream 51 also goes through a Variable Length Code (VLC) Huffman Decoder 71a where it is decoded into motion vectors 101 which go to a Motion Compensator 131. The Huffman Decoders 71a and 71b are shown as logically separate and distinct, although they may structurally and electronically be the same element.

The Motion Compensator 131 also receives a data stream derived from the first data stream 61 and the motion compensated data stream, summed in Summer 141. The output 151 of the Summer 141 goes to the pixel bus (not shown) and to storage, i.e., Future Frame Storage 111 and Past Frame Storage 121. The contents of the Future Frame Storage 111 and Past Frame Storage 121 are, as appropriate, inputs to the Motion Compensator 131.

Figure 4:
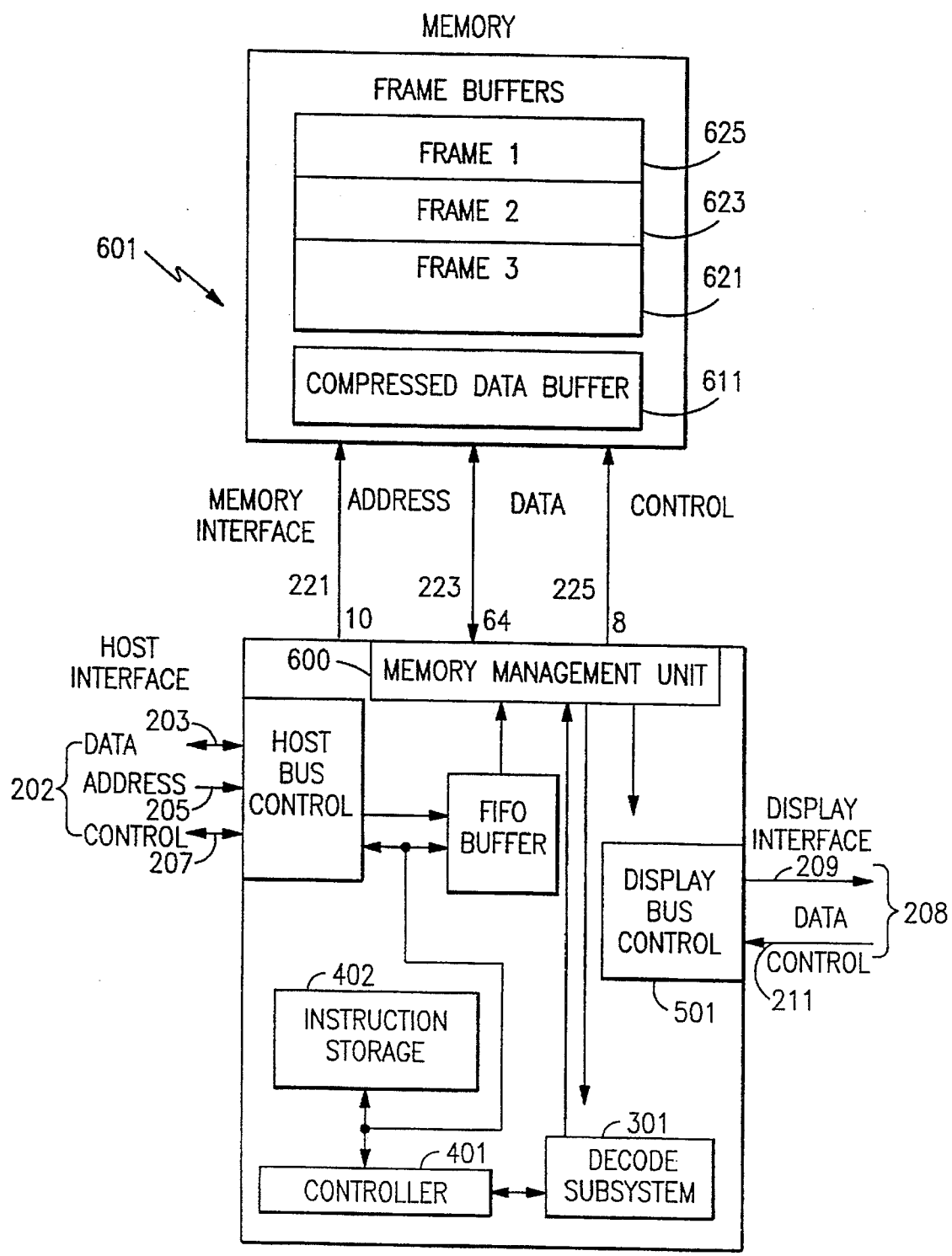
FIG. 4 is a block diagram of the functional units of the MPEG-2 Standard compliant decoder of the invention.

FIG. 4 shows the block diagram of the decoder system 201 of the invention. The system I/O includes three busses from the host interface 202 and two busses to the display interface 208. The buses from the host interface 202 include the data bus 203, the address bus, 205, and the control bus, 207. The data bus 203 may be a 16 bit or a 32 bit bus, or of some other width, it may be serial, and it may be bidirectional or unidirectional. The address bus 205 is a 6 bit bus, although other widths may be accommodated without departing from the invention. The control bus 207 is a 7 bit bus, although other widths may be accommodated without departing from the invention.

The display interface 208 busses are the data bus 209 and the control bus 211. The data bus 209 is for pixel data. The control bus 211 is for synchronization and control.

The system includes a host bus control element 231, a FIFO buffer 241, a decode subsystem 301, a controller 401, an instruction storage unit 402, a display bus control 501, and a Memory Management Unit 600.

The memory, an external memory 601, includes a Compressed Data Buffer 611 for receiving data from the host interface 202 via the FIFO buffer 241, and frame buffers 621, 623, and 625, for receiving and storing decoded frames, including future frames and past frames.

The interface between the memory management unit 600 and the memory 601 includes an address bus, 221, a bidirectional data bus, 223, and a control bus 225.

Figure 5:
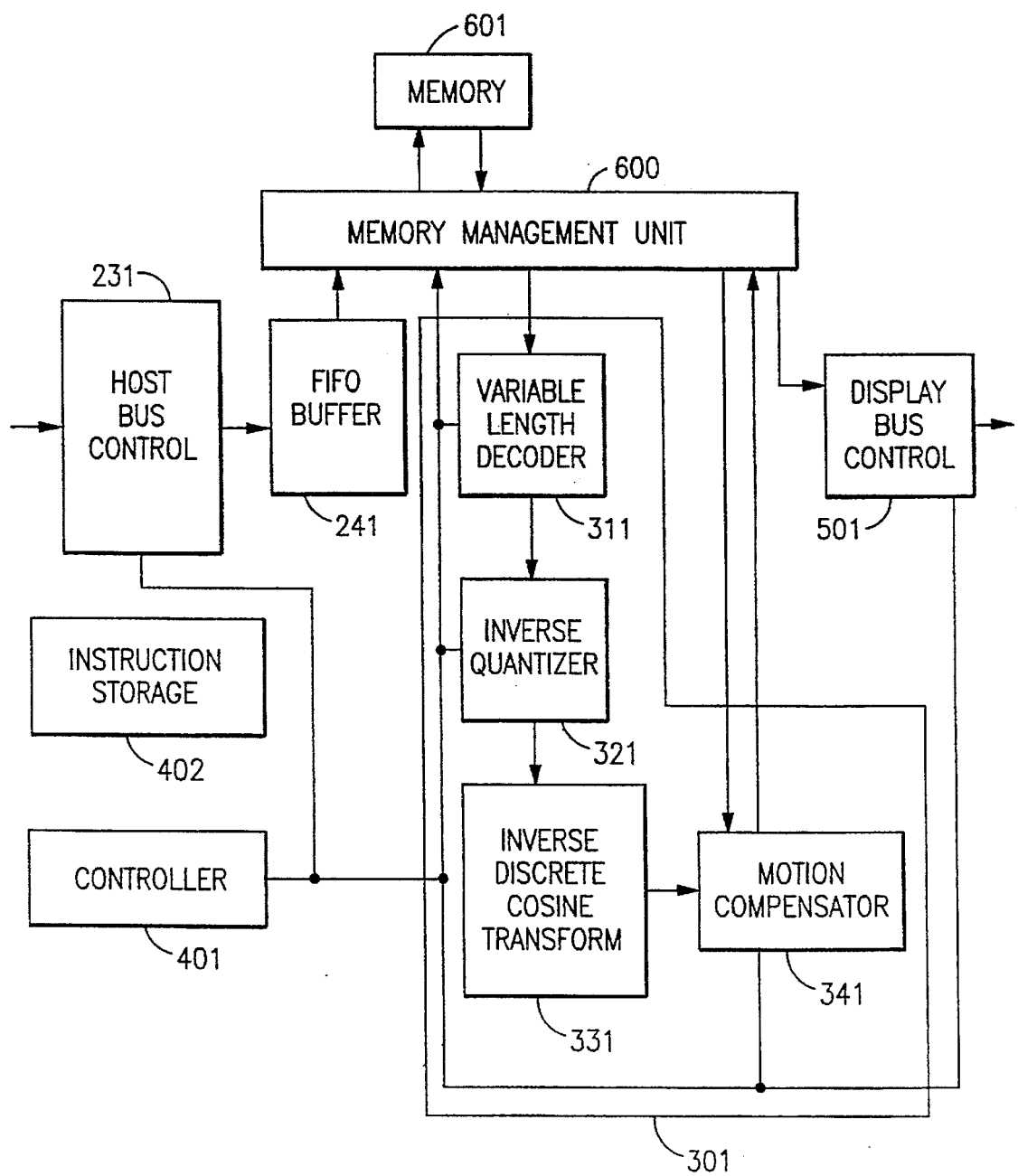
FIG. 5 is a block diagram of the decode subsystem of the MPEG-2 Standard compliant decoder of the invention.

The decode unit 301, shown with detail in FIG. 5, consists of functional units that operate under the control of the controller 401 and its associated Instruction Storage Unit 402. These decode functional units include the Variable Length Code Huffman Decoder 311, the Inverse Quantizer or Dequantizer, 321, the Inverse Discrete Cosine Transform unit, 331, and the Motion Compensation Unit, 341.

The controller 401 is the central point of control for the decoder. The controller 401 microcode is stored in an Instruction Storage unit 402. The controller 401 interacts with the host system through an external processor through the host or system bus for high level commands and status. The controller 401 is responsible for the control and command of the other functional elements, as well as providing global synchronization of these units.

The controller 401 is coupled to the Variable Length Code Huffman Decoder 311. This enables parsing of the code stream. Parsing of the code streams and processing of header information is done by the controller 401 interacting with the VLC Huffman Decoder 311.

The Variable Length Code Huffman Decoder 311 (VLC) contains tables for decoding the data stream and a local state machine that controls the decoding of run/level data for macroblocks. The VLC 311 is controlled by the controller 401 as header information and block run/level symbols are passed from the compressed bit stream. A local state machine decodes the run/level symbols and interacts with the Inverse Quantizer 321 to process the decoded signals.

To be noted is that variable length coding, e.g., Huffman coding, is a statistical coding technique that assigns codewords to symbols. Symbols with a high probability of occurrence are assigned short codewords, while symbols with a low probability of occurrence are assigned longer codewords.

The codes used in the MPEG-2 VLC decoder are taken from the MPEG-2 Standard. The codes form a class of codes known as prefix codes. In a prefix code system, no valid code is a prefix of another code. The number of bits assigned to each codeword is variable, from a minimum of 1 to a maximum of 16. The coded bits used to represent a sequence of symbols are a variable length string of bits. This bit string must be decoded sequentially in order to reconstruct the original sequence of symbols. As noted above, Huffman coding generates code tables based on symbol occurrence probabilities. The codes generated are minimum redundancy codes. The Huffman coding used by the MPEG-2 Standard is based on a static coding algorithm. The coding procedure used by Huffman Coding is lossless coding, because the exact sequence of symbols encoded is recovered by the decoding process.

The Inverse Quantizer 321 receives run/level (run/amplitude) coded symbols from the VLC unit 311 and outputs a block of 64 coefficients that are sent to the Inverse Discrete Cosine Transform Unit 331. The Inverse Quantizer 321 converts the run/level coded symbols to zeros and symbols, unzigs the data, handles differential pulse code modulation (DPCM) decoding for the Discrete Cosine coefficients, and dequantizes the data.

FIG. 2 shows the zig-zag scanning order of the Discrete Cosine Transform coefficients. The top left coefficient is the DC coefficient. All other coefficients are considered as AC terms. The numbers indicate the order in which the coefficients are read for run length and level coding.

The process after run length coding is to "unzig" the data. This means placing the "level" data in the correct positions relative to an 8 by 8 block or matrix. The "run" identifies the number of skipped positions, i.e., zeros. The levels also need to be further processed under quantization.

In quantization, that is, in encoding, the level is divided by a number called the "quantization factor" to become a quantized coefficient. Quantization and dequantization introduce some degree of loss into the decoded data. In the decoding process, the unzigged quantized coefficient ("level") will be multiplied by the quantization factor to produce a dequantized coefficient. The quantization factor is used by the decoder to decode the datastream, and is part of incoming datastream to the decoder. This coefficient, a frequency domain value, will go to the Inverse Discrete Cosine Transform unit 331 to be transformed back to a time domain based signal.

Intra blocks, also known as I-Pictures or as I-frames, contain DC coefficients that are Differential Pulse Code Modulation coded. This means that the DC value of the previous value predicts the current 8 by 8 block DC value. The quantized difference is then coded. The Differential Pulse Code Modulation coding for the DC coefficient is applicable for all three components, i.e., the Y component, the Cb component, and the Cr component. After Differential Pulse Code Modulation decoding, the DC coefficients of the 8 by 8 block will go through the inverse quantization process before being sent to the Inverse Discrete Cosine Transform unit 331.

After a block of signals have been dequantized in the Dequantizer unit 321 the Inverse Discrete Cosine Transform unit 331 performs a two dimensional inverse discrete cosine transform on the 8 by 8 block to form a reconstructed image block. The reconstructed image block is added to the predicted block from the Motion Compensation Unit 341 if required. The Inverse Discrete Cosine Transform Unit 331 and the Motion Compensation Unit 341 synchronize their outputs during this summation step. The summation results are then sent to the memory 601 for output to display and for reference.

The Motion Compensation Unit 341 receives commands and address from the controller 401 and performs the required interpolations to form predicted image blocks. The predicted output block is synchronized to the output of the Inverse Discrete Cosine Transform and added to the output of the Inverse Discrete Cosine Transform reconstructed block by this summation step.

Motion compensation exploits the temporal redundancy in video pictures by coding the difference between a current block and a block in a previous picture or in a future picture. Motion means the pels will be in a different location in the current picture than in the reference picture. This displacement is given by motion vectors. These motion vectors and the coded difference between the current and the future picture construct the motion compensated picture.

Motion compensation includes prediction from past, or future, or both past and future pictures, utilizing motion pels of full pel or half pel accuracy. Motion compensation is carried out in both interlaced and non-interlaced video data streams.

Figure 6:
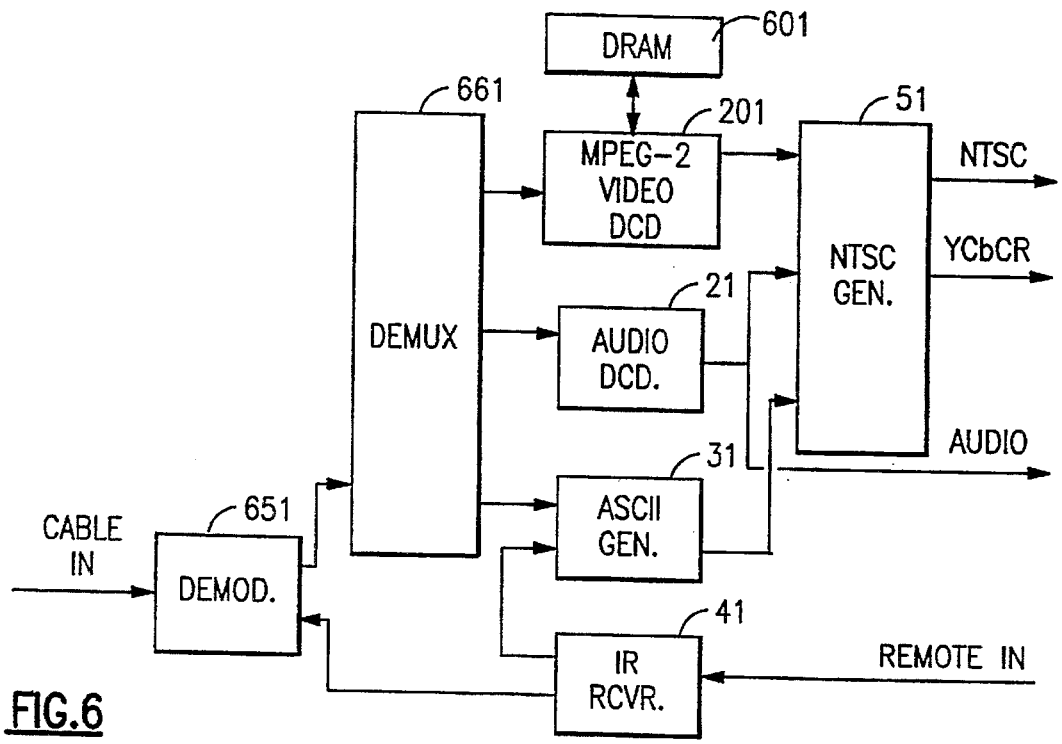
FIG. 6 is a block diagram of the decoder of the invention in a dedicated or television set top box environment.

The decoder system of the invention is shown in a dedicated, digital entertainment terminal environment in FIG. 6. The system receives input from the cable or upstream broadcasting means 651. This is demultiplexed into video, audio, and ASCII portions in demultiplexer 661. The system includes the video decoder 201, an audio decoder 21, an ASCII Generator 31, and an Infrared Receiver 41. The ASCII Generator 31, the Audio Decoder 21, and the Video Decoder 201 provide outputs through the NTSC (National Television Standards Committee) generator 51

Personal Computer Environment

In a personal computer, workstation, or other computation environment the compressed video data input comes from either a storage device or a network communications adapter. The video data is typically handled as a packet transfer across a system I/O bus. This means that the system of the invention must be capable of receiving bursts of data at high rates for a limited time, and then allow other devices to use the system I/O bus while the encoded data is being processed. This is accomplished through the use of the internal FIFO buffer 241 which must be large enough to handle such data bursts. In a computation environment the decompressed video data stream is provided on the display (Pixel Bus) Interface, which can directly interface to a video controller. Alternatively, the video data stream can be sent on a high bandwidth system bus to a graphics processor frame buffer.

Figure 7:
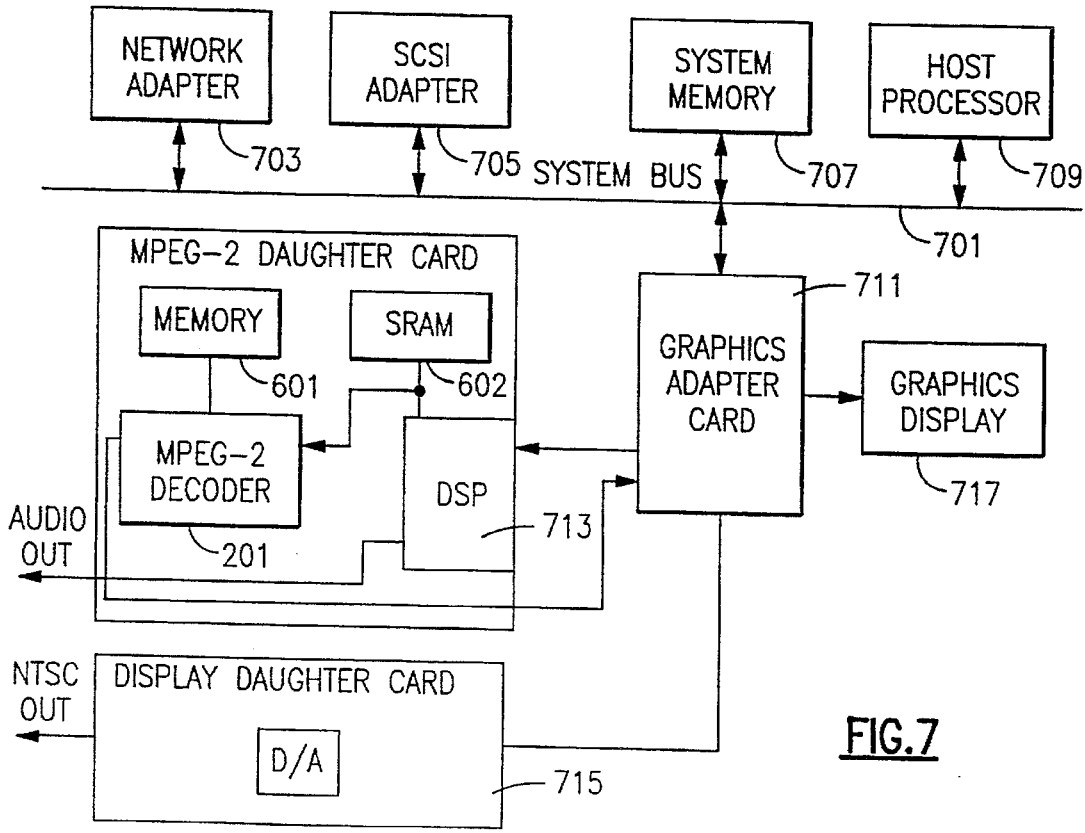
FIG. 7 is a block diagram of the decoder of the invention in a personal computer environment.

A typical PC system environment is shown in FIG. 7. The FIGURE shows the system bus 701, with various system bus subsystems, e.g., a network adapter 703, a SCSI adapter 705, a system memory 707, and a host processor 709. The system of the invention is connected to the system bus 701 through a graphics adapter card 711 and includes a digital signal processor 713, the decoder 201 of the invention, DRAM 601, and SRAM 602 The Graphics Adapter Card 711 provides interface to an optional Display Daughter Card 715, to a Graphics Display 717, or to both.

Processor I/O

The system has three external interfaces, a host interface 202, a display interface 208, and a memory interface 221, 223, 225.

The host interface 202 is the primary control and compressed data interface. This interface 202, a 16 bit slave interface, provides host processor, i.e., transmission network, access to the internal registers, local storage, and functional units of the system. The Host Interface 202 functions as the command, status, and encoded data interface for the system. High level systems commands and status are passed between the decoder system of the invention and the host system through this host interface 202.

The host interface 202 provides a generic interface protocol to the host, that appears as a register port interface.

The host interface 202 includes the address, data, and control pin out. The pin outs include address, data, chip select, write pulse, output enable, FIFO buffer full, system clock, timer clock, and reset. The chip select pin indicates that the chip is being selected for register access. The write pulse is an instruction to either receive data from the host or write data to the host. Output Enable is used to tristate the Host data bus, allowing the chip to drive the host data bus. FIFO Buffer Full is only used for dynamic, synchronous operation, as in a PC environment.

The System clock is an oscillator that provides timing for the internal processor and operations. This clock does not affect the Host Interface control signals which are asynchronous with respect thereto. The timer clock is an externally generated clock signal that synchronizes the video with the audio. Reset is a power on reset signal.

The host bus carries signals that initialize the decoder, by resetting the chip, setting the chip mode, setting display parameters, loading Display Instruction Storage, starting the decoder processor, loading compressed data into the FIFO buffer, setting the system clock reference, and starting the decoder.

The Memory Interface supports direct attachment to a local memory that stores multiple frames of decompressed video data, partially decoded pictures, and compressed input data. Reference pictures used for motion compensation are stored in External Memory 601. The system input is stored in a compressed data buffer 611, which may be part of the External Memory 601. The compressed data buffer 611 is loaded from the host bus interface 202 and read into the Variable Length Coder 311 under the control of the controller 401.

The Display or Pixel Bus Interface 208 is the primary interface for passing decompressed video image data to a downstream unit, such as a display unit, or a graphics interface card, that will ultimately be responsible for displaying the video.

This consists of 16 bits of pixel data output, and control inputs FLDID, the field ID; PCLK, the Pixel Clock; CB, the composite blank, which indicates the inactive portion of each line; and POE, the Pixel Output Enable, generated externally and used by the decoder to control the drivers to the output.

Controller

The controller 401 controls the functional elements of the decoder system 201. The controller 401 is a Reduced Instruction Set Controller element with a minimal instruction set. In a preferred embodiment it is formed of a CMOS standard cell integrated circuit chip, although other implementations may be used. Critical to the controller is the minimal instruction set described herein with branching to match the MPEG-2 Standard layers.

Video decompression standards, such as the MPEG-2 Standard, utilize a video decoder to receive an encoded, compressed, serial bit stream, and translate the encoded, compressed serial bit stream into a sequence of moving pictures. As described herein, the syntax of the bit stream is hierarchical, using a layered structure to define decoding parameters to be used for an entire sequence, for a group of pictures, for an individual picture or pictures, and for the motion vectors.

The MPEG-2 Standard syntax allows many possibilities of encoding techniques, and allows for extensions to the syntax itself for future changes. Therefore, a video decoder must be flexible enough to allow reception of these various types of streams, while being very cost competitive.

Thus, there is provided, a specialized controller 401 which controls a specialized decompression and decoding system 201. The controller 401 reads out each parameter from the encoded, compressed bit stream, in real time, and makes decisions upon the decoding at every level of the architecture. The controller 401 allows the use of a limited set of instructions, i.e., a reduced instruction set, in order to keep the decoding system small and cost effective.

The controller 401 provides a Read Symbol Instruction that provides direct read control from the encoded bit stream. This allows fast processing since the Read Symbol Instruction works closely with the rest of the system in reading the bit stream in real time while simultaneously being able to make decisions within the execution cycle without further bit or character tests to achieve the flexibility necessary for supporting the MPEG-2 Standard syntax.

The controller 401 also has Fast Branching control for the Read Symbol Instruction. This allows specialized decision making based upon the current parameter being read out of the encoded, compressed bit stream.

The controller 401 also has Modulo-Add with F code adjustment. This reduces the software steps for motion vector calculations.

The encoded, compressed bit stream consists of a concatenation of parameters. Many of these parameters are represented by a variable length code (VLC). The variable length code requires translation to an expanded number of bits. The parameters are grouped together and separated by start bits, which are code points that have a fixed number of zeros preceding some unique value. The start codes separate the layers and extensions in the encoded video standard, i.e., the MPEG-2 Standard.

Figure 8:
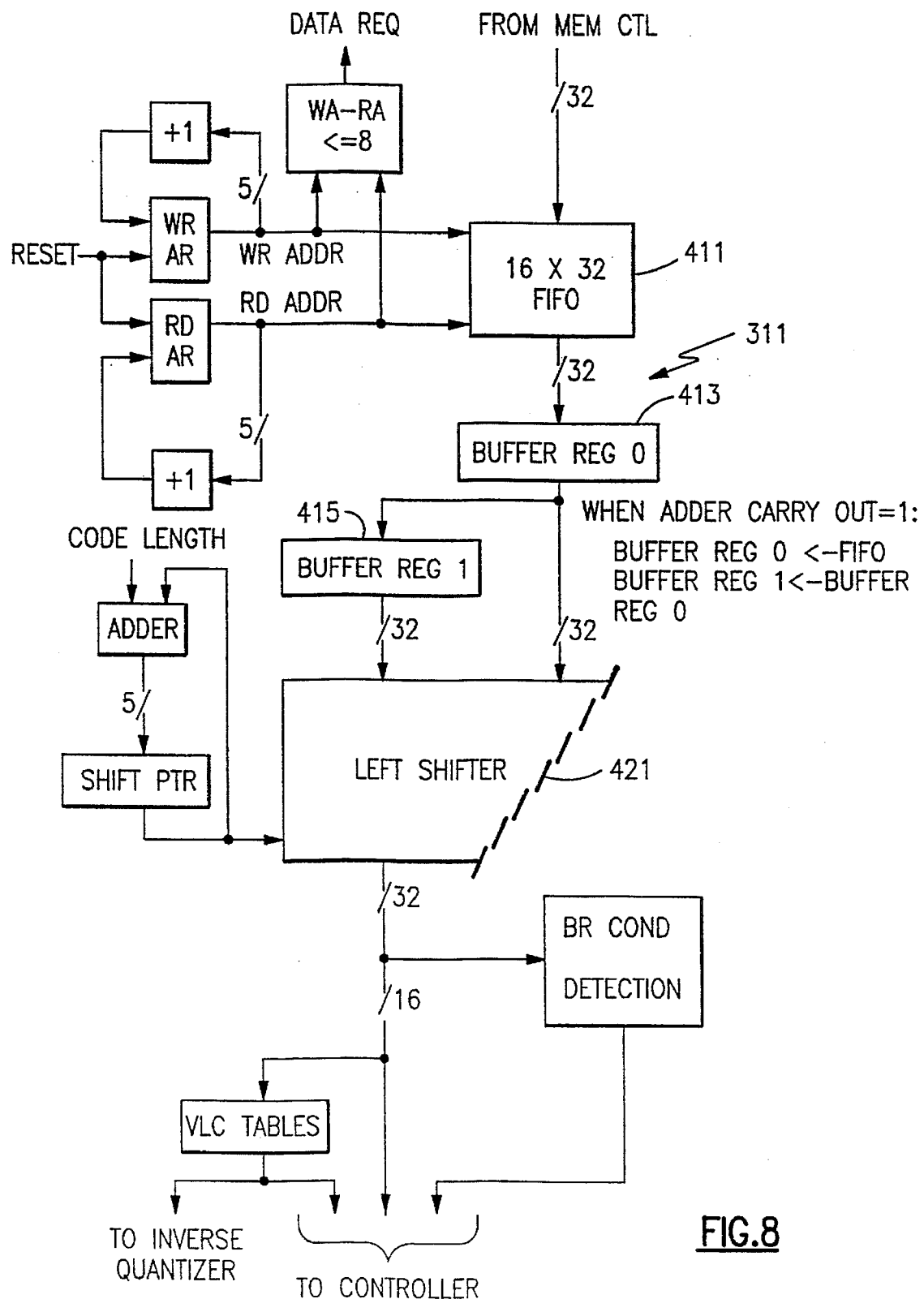
FIG. 8 is a representation of the front end bit stream logic of the variable length decoder.

The controller 401 participates in the read of every parameter that is presented. The front end bit stream logic located in the VLC is shown in FIG. 8. Hardware is used to feed the encoded bit stream from the memory, into a FIFO buffer 411, and then into registers 413 and 415 in order for the controller 401 to perform the Read Symbol Instruction. The left shifter 421 allows the controller 401 to see the most recent 16 bits of the bitstream left justified. The bit stream is otherwise unmodified.

The controller 401 receives either (1) the output of the shifter 421, or (2) the decoded value of the shifter output. The decoded value of the shifter output is obtained from the VLC decoder by VLC tables. The output of the shifter 421 goes through a multiplexer and the result is placed in a symbol register 451, shown in FIG. 9.

Memory Management of the IBM MPEG2 Video Decoder

Frame Buffer Access Control

There are three frame buffers used in the decoder of the invention:

The Current Frame (currently being decoded),
The Past Reference Frame, and

The Future Reference Frame.

This is a reduction from the four frame buffers heretofore thought necessary. A dedicated Display Buffer has been eliminated and the picture currently being displayed will come from either the Past Reference Frame (for I- or P-pictures to be displayed) or the Current Frame (for B-pictures being displayed).

The three frame buffers are accessed on a rotating basis and each of them is large enough to hold a complete, decoded frame. The rotation through the frame buffers is handled in the Memory Control hardware, as follows.

Frame Buffer Pointer Control

Memory Address Pointer Control Algorithm

The control algorithm is illustrated in FIG. 10 where control is exercised through the following pointer equations:

$C = D*NBF + \hat{}NBF*(T*(PREV\hat{}=B) + P*(PREV=B*PRES\hat{}=B))$ $P = C*NBF + \hat{}NBF*F*(PRES\hat{}=B)$ $F = T*(PREV\hat{}=B*PRES=\hat{}B) + P*(PREV=B*PRES\hat{}=B)$ $D = C*NBF + \hat{}NBF*(F*(PRES\hat{}=B) + T*(PREV\hat{}=B*PRES=B))$ $T = D$ where C=Current picture pointer
P=Past picture pointer
F=Future picture pointer
D=Display picture pointer
T=Temporary pointer
PRES=Present picture type
PREV=Previous picture type
NBF=No B frame mode The algorithm described above and shown in FIG. 10 is implemented completely in hardware by the Memory Control Unit on the MPEG Decoder chip, although it can be implemented by microcode or software.

Frame Buffer Management of the Video Decoder

Two Modes of Operation are supported:

Normal Mode

In this mode DRAM is allocated between 2 and 4 MBytes with an 8 byte data bus. This supports full MPEG2 Main Level, Main profile Video Decoding. Higher data rates plus 4:2:2 mode support can be achieved with 4 MBytes of DRAM.

Low Delay Mode

In this mode DRAM is allocated at 1 MByte, with a 4 byte data bus (4:2:2 mode requires 2 MBytes of DRAM). Bit streams are limited to MPEG2 I and P pictures only.

In addition to these two modes, the memory management scheme supports seamless sequence switching between bit streams of any resolution. FIG. 11 shows how physical memory is allocated for each mode. User data and On-Screen Display buffers are located in low memory. Next, there are three logical frame buffers with each one divided into a luminance and chrominance pair. Next is a Spill Buffer, also divided into a luminance and chrominance pair. For 4:2:0 images, the chrominance buffer is equal to one half of the luminance buffer. For 4:2:2 images, the buffers would be equal sized. The compressed data buffer is allocated last.

Figure 9:
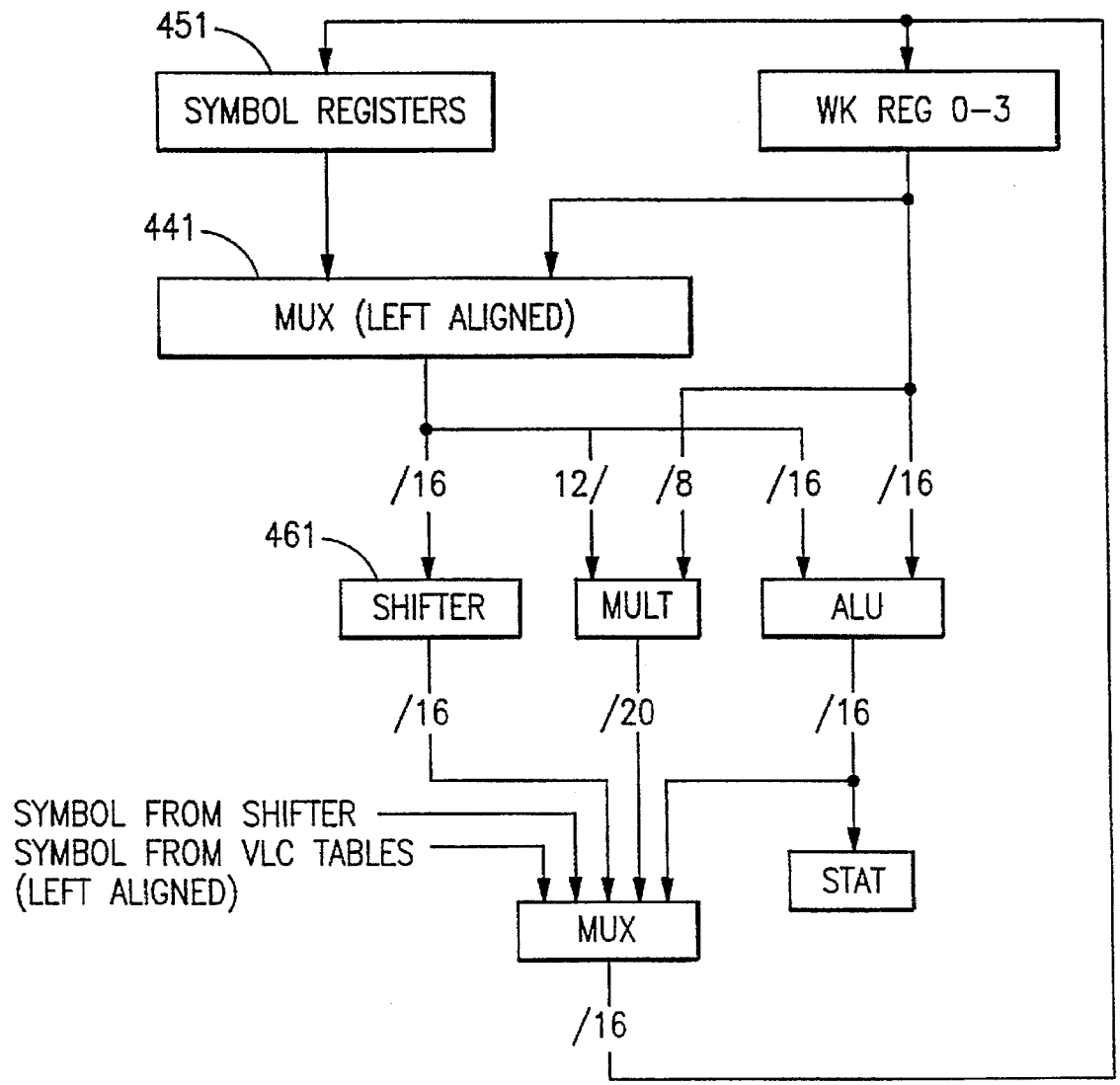
FIG. 9 is a representation of a portion of the output of the control processor.

The Buffer origins are computed by the microcode, based on NTSC vs. PAL and 4:2:0 vs. 4:2:2 configurations. These addresses are all generated based on a maximum frame size of 720×480 (NTSC) or 720×576 (PAL). The values shown in the FIG. 9 are calculated for NTSC and 4:2:0 mode.

Frame Buffer Management in Normal Mode

As frames are decoded they are placed into one of the three logical frame buffers. Reference Frames, I or P frames, are stored completely within one buffer. The decoding process assigns the buffer dynamically to the frame being decoded. No reference frames are necessary in order to decode an I frame. One reference frame is required in order to decode a P frame because of the forward motion vectors. Two Reference frames are required in order to decode a B frame. This is due to the existence of both forward and backward motion vectors.

Figure 1:
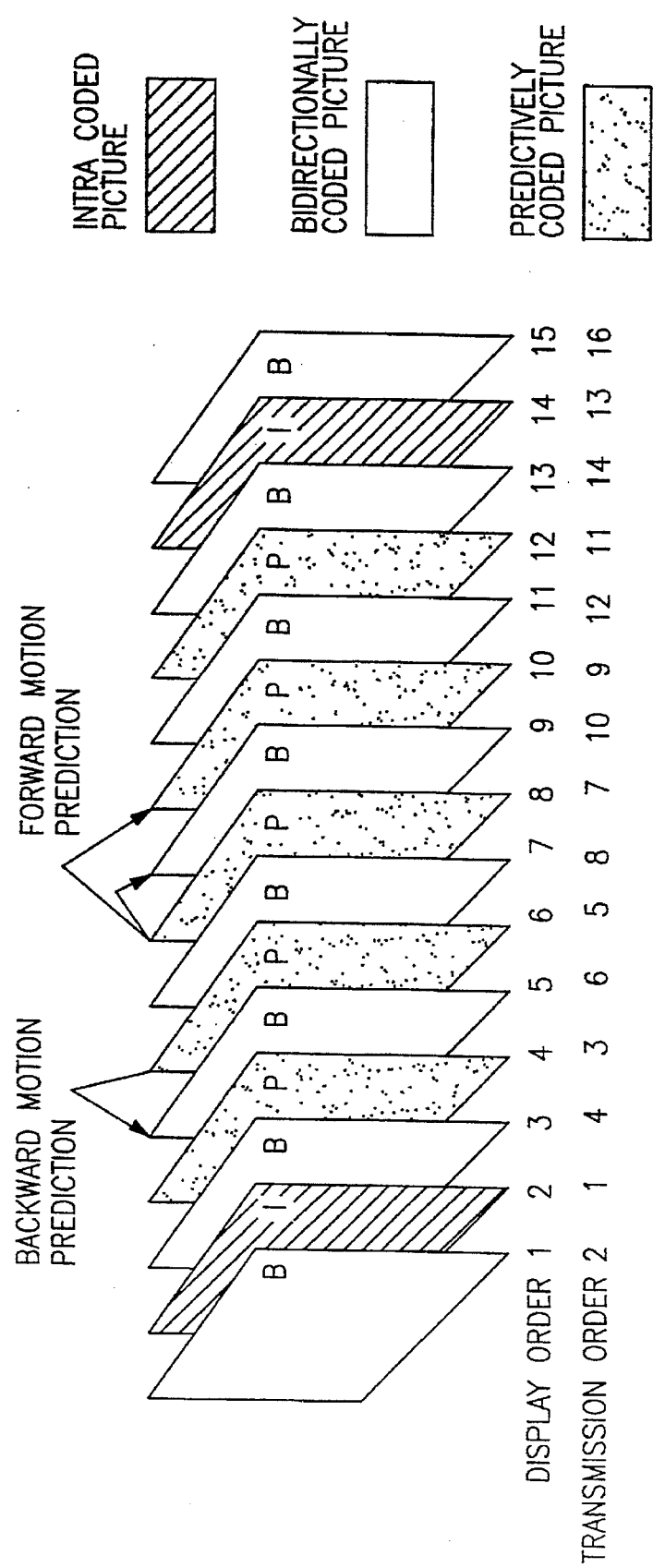
FIG. 1 shows the three type of pictures and their relationship under the MPEG-2 Standard, i.e., "I" Intrapictures, "P" Predicted Pictures, and "B" Bidirectionally Predicted Pictures.

The existence of B Frames creates a situation where decoded frames are not received in display order. This is illustrated in FIG. 1. This allows time to decode both the past reference frame and the future reference frame before decoding the B Frame. In order to minimize memory size, this requires that successive B frames must reuse a portion of the same area in memory. This is especially important to maintain the DRAM configuration to within 2 MBytes, an important cost issue to any application.

The Spill Buffer is used to accomplish this task. The Spill Buffer is an overflow buffer that is dynamically assigned to one of the three buffers.

Hardware makes use of a buffer size register and a spill size register to create a logical buffer equal to the sum of each. Hardware automatically detects whether a buffer's logical address exceeds the buffer size and steers the address to point at the Spill Buffer. A combination of hardware and microcode manage the wrapping of logical addresses from the end of the Spill Buffer into the beginning of the frame buffer.

After decoding one B frame, the Spill Buffer allows the decoding to begin on the second B frame while the first B frame is being displayed. The spill area provides some spacing between the two processes, so that they do not run into each other. A hardware interlock does exist, in the event that the decode process is fast, and will hold back the decoding until the display process is beyond the point of conflict.

Figure 12:
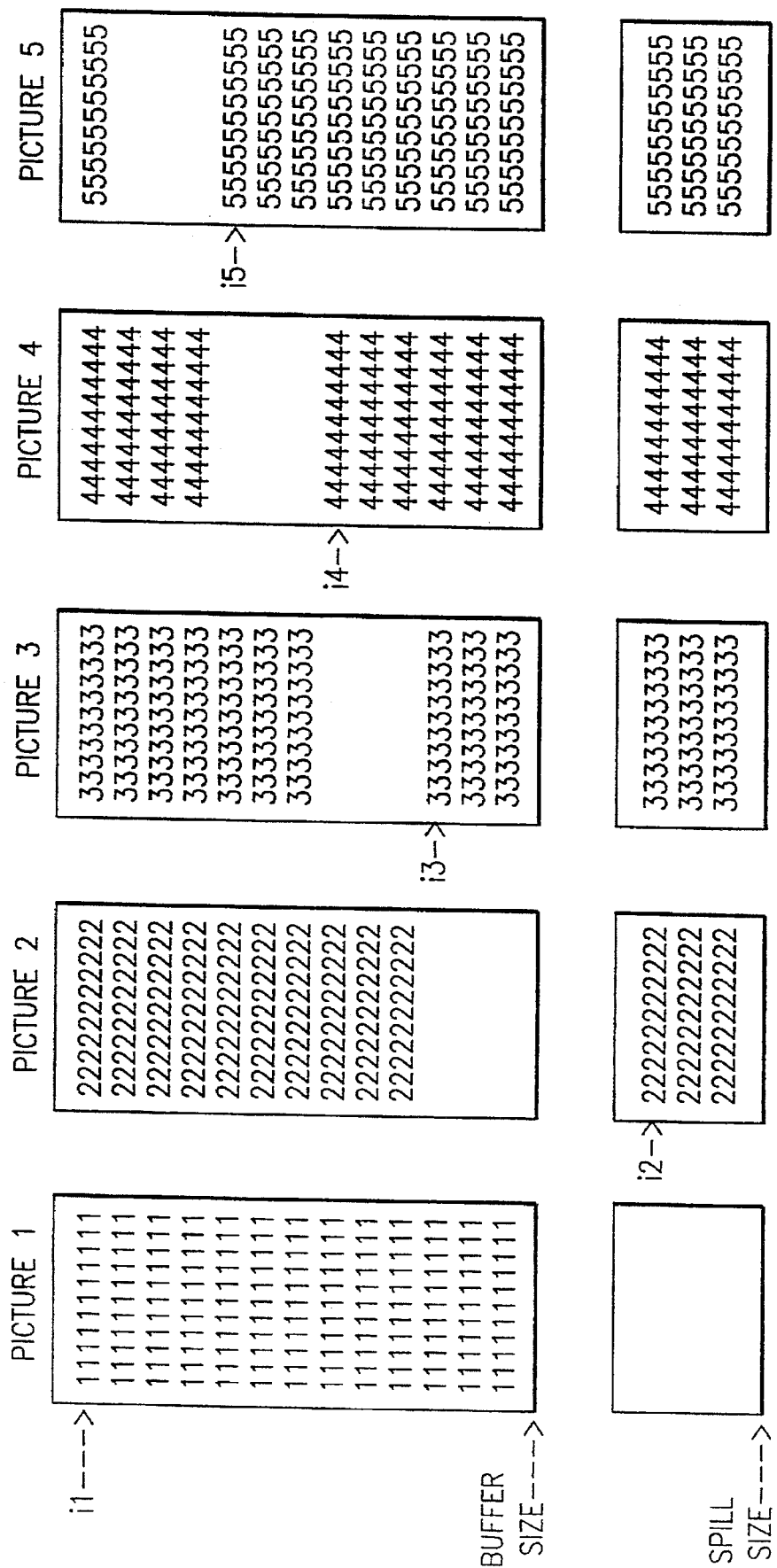
FIG. 12 shows the movement of pictures for the normal mode with full size B frames according to the invention.

An example is shown in FIG. 12. In this case the decoded frame is of the maximum size. The first B frame is represented by picture 1, the second by picture 2 and so on. Furthermore, let the FIG. 10 represent only the luminance portions of the frame buffer and Spill Buffer. The microcode keeps track of the starting address of the decoded frame by means of an index register. This register will change with each new picture, and is shown as having values i1, i2, etc. in FIG. 12.

Picture 1 is loaded starting at the beginning of the frame buffer at index=i1. The index is adjusted to i2 for Picture 2 to begin at a location immediately following picture 1. Since picture 1 totally filled the frame buffer, picture 2 is loaded at the beginning of the Spill Buffer, and wraps around to the beginning of the frame buffer to complete its decoding. Similarly, picture 3 begins immediately following picture 2. Hardware senses when the frame buffer boundary is reached in real storage, and automatically adjusts the real address to point to the top of the Spill Buffer to continue decoding. Again, the Spill Buffer fills up and picture 3 must wrap to the beginning of frame buffer to complete its decoding. A similar process is repeated for pictures 4 and 5, or beyond that if they remain B frames. As soon as another I frame or P frame is detected, the memory system will switch to a different frame buffer, where it can store the entire decoded frame.

In this case both the buffer size and the spill size is equal to the maximum allocated values. This value is recorded in a modulus register, which contains the sum of the buffer size and the spill size.

There is a restriction on the Spill Buffer size. Its luminance portion must be equal to an exact multiple of 4 macro block rows (64 lines of the video buffer data). This is necessary to adequately perform the wrap back in all cases of picture types, including frame and field mode.

Figure 13:
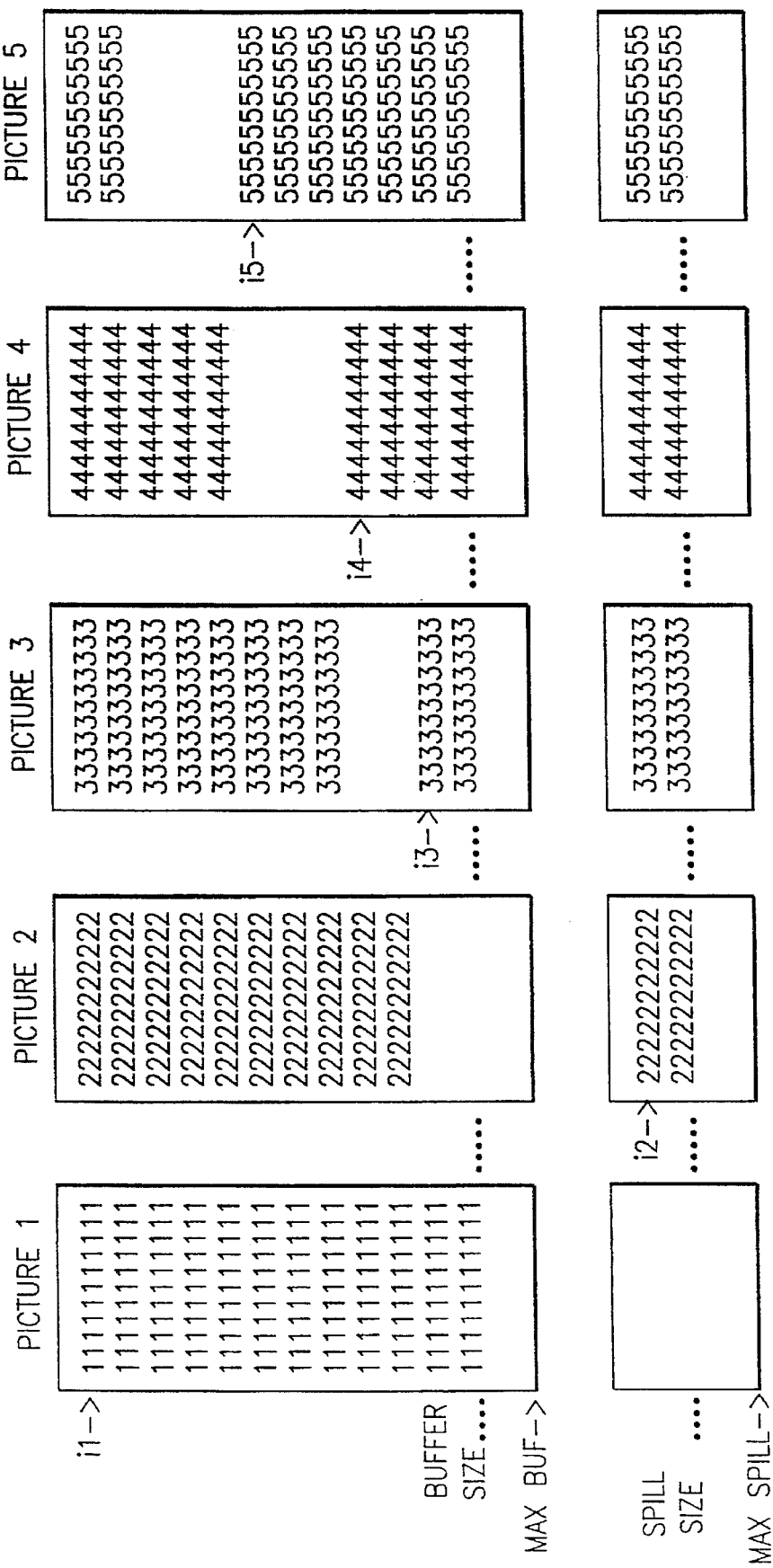
FIG. 13 shows the movement of pictures for the normal mode with B frames smaller then full size according to the invention.

Obviously bit streams may exists where the resolution is less than the maximum size, i.e. 480×480 or 544×480. FIG. 13 shows an example where this is true.

In this case the buffer size is set to a value that is less than the maximum allocated area for the frame buffer. The index is still updated between pictures by appending directly after the last frame decoded, however the buffer size is smaller, which causes the hardware to access the Spill Buffer each time that it sees a logical address greater than the buffer size. Also, the Spill size can be less than maximum, and the wrap back to the beginning of the frame buffer is accomplished by the modulus register which is equal to the sum of the buffer size and Spill Buffer size values.

Limiting the amount of area that is used in both the frame buffer and the Spill Buffer allows the decoder to switch between successive streams that are different in size. The base address pointers do not require changes, only the buffer size, spill size and modulus values change.

Frame Buffer Management in Low-Delay Mode

In MPEG-2 there is a special mode of operation where B-frames are not present. This is called the Low Delay mode, since there is no time required to re-order the frames for presentation (i.e. display). This is also referred to as No B-frame Mode, as in the previous section.

Since there are no B-frames, only one reference frame is required to decode a P-frame, which will contain only forward motion vectors. The memory requirements for this mode are, therefore, significantly less that normal MPEG-2 requirements. In fact, only 1 MB of DRAM is required to support operation of the Decoder chip in Low Delay mode (assuming NTSC and 4:2:0 configuration). This mode can be supported with the same hardware design by simply changing some of the register values via on-chip microcode.

The Low-Delay scheme works with one full-sized frame buffer with one large Spill Buffer logically attached to it. The frame buffers are set to the maximum picture size while the Spill Buffer size is set to 256 lines (as opposed to the 64 lines that are used in the Normal Mode).

This mode then treats all frames (both I and P) just as Normal Mode handles B-frames. After decoding one frame, the Spill Buffer allows the decoding to begin on the second frame while the first frame is being displayed. The spill area, again provides some spacing between the two processes, so that they do not run into each other. The same hardware interlock exists to hold back the decoding, if necessary, until the display process is beyond the point of conflict.

Figure 14:
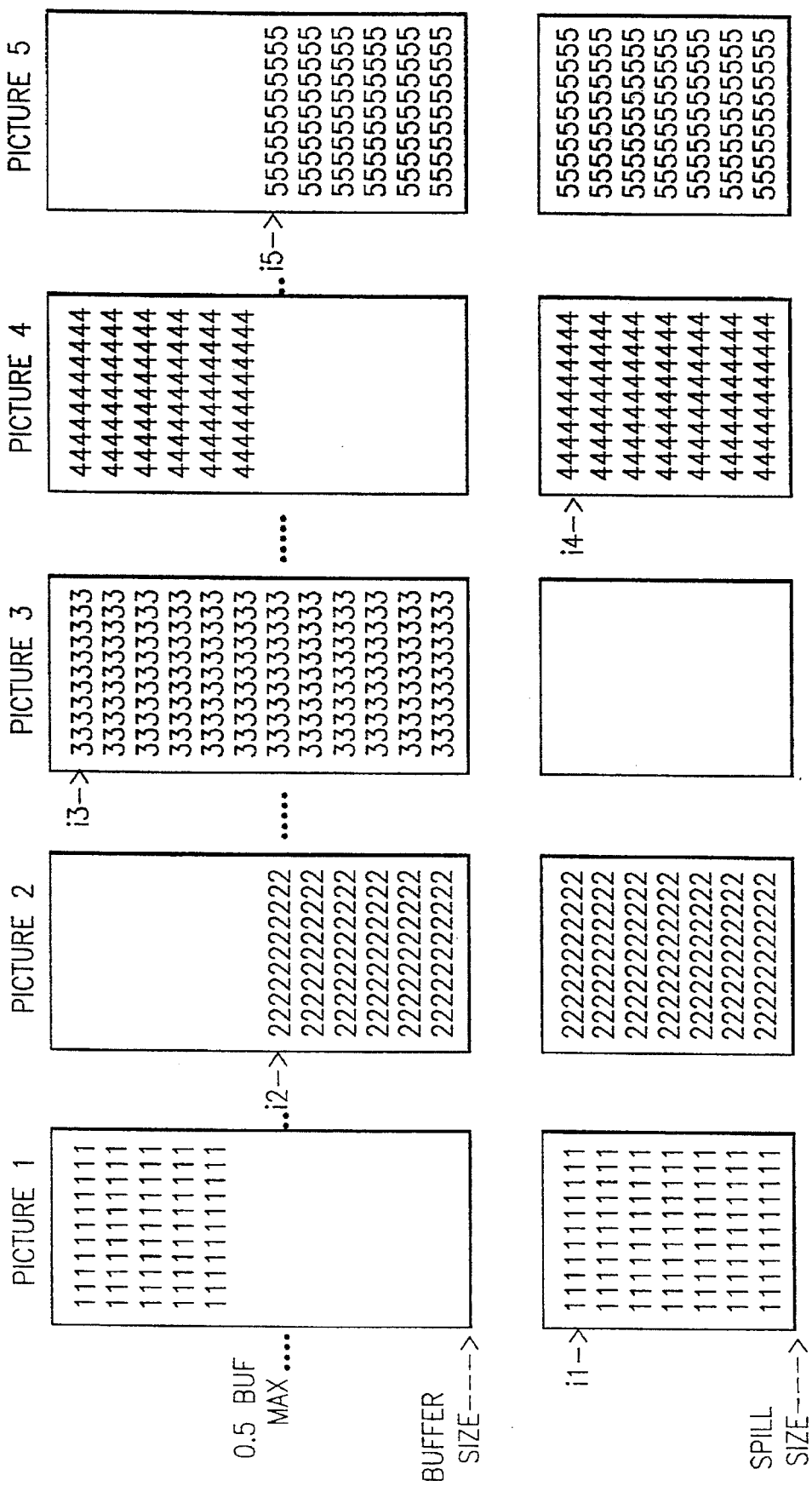
FIG. 14 shows the movement of pictures for the low delay mode with full size B frames according to the invention.

An example of Low-Delay mode operation is shown in FIG. 12. In this case the decoded frame is of the maximum size. The first frame is represented by picture 1, the second by picture 2 and so on. Again, only the luminance portions of the frame buffer and Spill Buffer are shown. The microcode keeps track of the starting address of the decoded frame by means of the index register. This register will change with each new picture, and is shown as having values i1, i2, etc. in FIG. 14.

Picture 1 is loaded starting at the beginning of the Spill Buffer at index=i1 and wraps around to the beginning of the frame buffer. Hardware senses when the Spill Buffer boundary is reached in real storage, and automatically adjusts the real address to point to the top of the frame buffer to continue decoding.

The index is adjusted to i2 for Picture 2 to begin at a location half way into the frame buffer. Hardware again senses when the frame buffer boundary is reached in real storage, and automatically adjusts the real address to point to the top of the Spill Buffer to continue decoding.

Picture 3 then begins following Picture 2, at the top of the frame buffer. The cycle continues for pictures 4 and 5 and beyond.

As shown, Low-Delay mode essentially runs with 3 established starting points for all picture decoding. The microcode controls the cycle of starting addresses by updating the index register in the following order:

i1=Spill Buffer start address
i2=0.5 Maximum Frame Buffer address
i3=Frame Buffer start address
i4=Spill Buffer start address
i5=0.5 Maximum Frame Buffer address
i6=Frame Buffer start address
in=repeat above sequence.

DRAM Controller Memory Management

The DRAM controller receives a logical address from the functional units and converts the logical address to a physical address based on the modulus, frame size, base address, and buffer pointer logical to physical map inputs. The process is described below and shown in FIG. 16.

Figure 15:
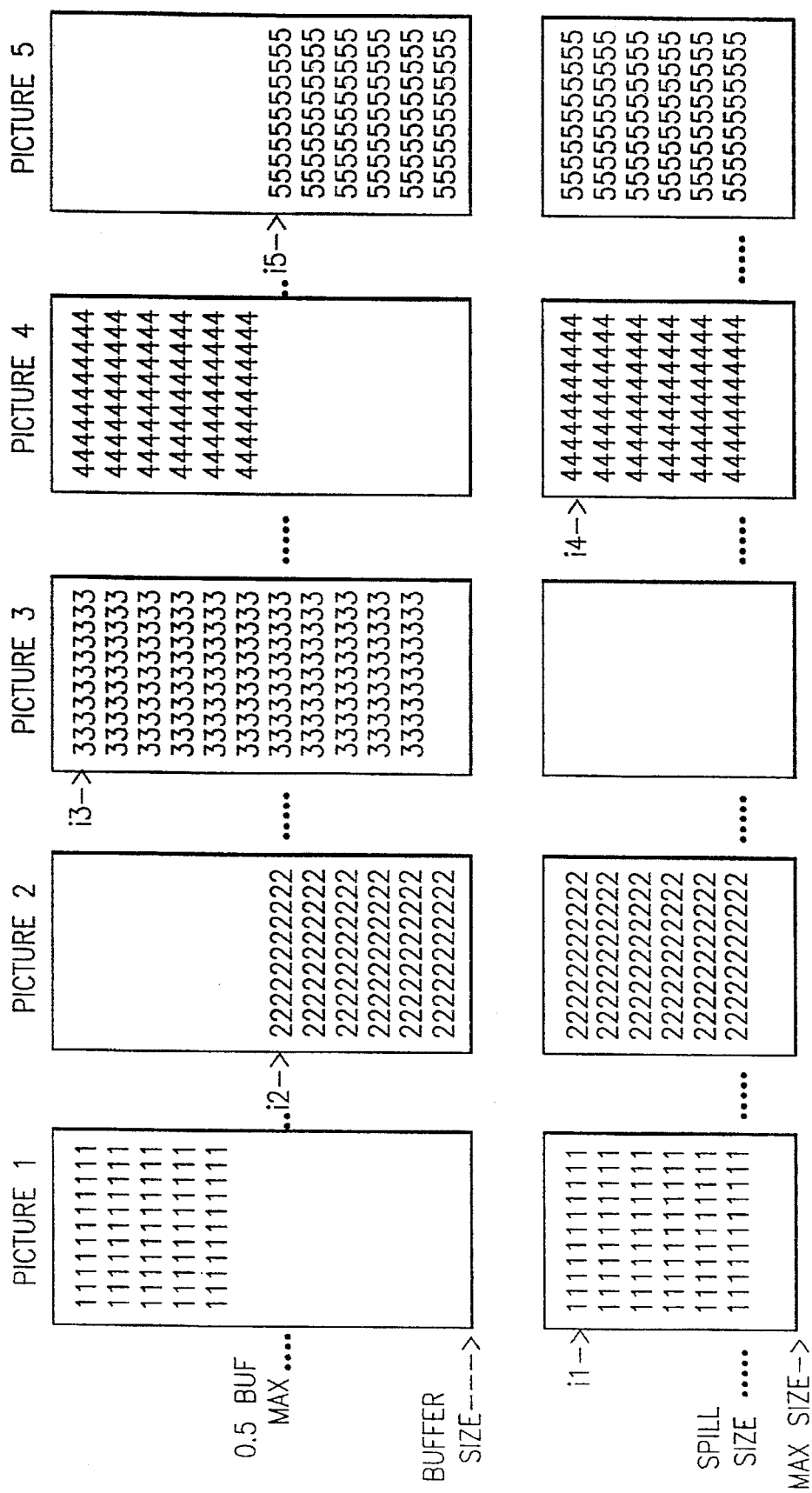
FIG. 15 shows the movement of pictures for the low delay mode with B frames smaller then full size according to the invention.

The input from a functional unit, such as motion compensation, is a Unit Logical Address, a Buffer Pointer (current, future, past) and whether Luma or Chroma is being accessed. The Unit Logical Address is actually an offset into one of three frame buffers. The unit logical address is converted to a Modulo Logical Address (ModLA) against the Modulus register. Using Picture 1 in FIG. 15 as a reference, as the picture is decoded and the picture data reaches the bottom of the Spill Buffer, the address wraps around the top of the Frame Buffer. The ModLA refers to this control process.

An Adjusted Logical Address (Adj Logical Addr) is generated by another modulo operation with the Frame Buffer Size Register. If the ModLA is larger than the Frame Buffer Size, then the Spill Buffer is output as the Logical Buffer Pointer (LogBPtr) rather then the input BPtr. This is illustrated in Picture 2 of FIG. 15. When the picture data reaches the bottom of the frame buffer the hardware switches the base address to that of the Spill Buffer, and the offset is adjusted to start at the top of the Spill Buffer.

The Log B Ptr is converted to a real Real Buffer Pointer (Real Bfr Ptr) by table lookup using the Memory Address Ptr algorithm result. This is shown in FIG. 10.

A Base Address is generated as a result of a register lookup using the Real Bfr Ptr. The on-chip microcode sets up the base address values of the frame buffers according to the system configuration as shown in FIG. 11.

The final Physical Address to DRAM is then generated by adding the Adj Logical Addr to the Base Address.

Low Delay Mode, Frames smaller than Full Size

This design is flexible, since the hardware control registers are, themselves, controlled by the on-chip microcode. This design also provides for seamless switching between video streams that may contain different size pictures (for example, an MPEG-2 stream followed by an MPEG-1 stream).

The method and apparatus of the invention reduces the need for frame buffers from 4 to 3. It accomplishes through the use of a Spill Buffer. The Spill Buffer both reduces the need for 4 frame buffers to 3+ for MPEG2 pictures, and handles different size pictures, as MPEG1 pictures and MPEG2 pictures. A further aspect of the frame buffer is that it handles frame and field decoded pictures without overwriting the display picture, and it handles both Luminance and Chrominance data.

The Low Delay Mode is a further aspect of the invention, useful with I-only and I-P pictures streams. The Low Delay Mode reduces memory requirements from 4 MB to 2 MB or even 1 MB in some cases. The Low Delay Mode uses only 1.5 frame buffers, handles different size pictures, handles frame and field decoded pictures without overwriting the display picture, and handles both Luminance and Chrominance data.

The Stream Switch is a still further aspect of the invention. It handles switching between different size pictures with no disruption of the video quality.

The Hardware Control aspect of the invention converts logical address to physical memory address.

While the invention has been described with respect to certain preferred embodiments and exemplifications, it is not intended to limit the scope of the invention, but solely by the claims appended hereto.

We claim:

1. A digital video decoder comprising an input data buffer, a variable length decoder, a dequantizer, an inverse discrete cosine transform decoder, a motion compensator, and a frame memory, said frame memory having at least a past reference frame buffer, a future reference frame buffer, a frame buffer for a frame currently being decoded, and a Spill Buffer, said Spill Buffer being dynamically allocable within said frame memory as frames are decoded, and where said three frame buffers are accessed on a rotating basis according to the following algorithm:

$C=D*NBF+\text{^}NBF*(T*(PREV\text{^}=B)+P*(PREV=B*PRES\text{^}=B));$ $P=C*NBF+\text{^}NBF*F*(PRES\text{^}=B);$ $F=T*(PREV\text{^}=B*PRES=\text{^}B)+P*(PREV=B*PRES\text{ ^}=B);$ $D=C*NBF+\text{^}NBF*(F*(PRES\text{^}=B)+T*(PREV\text{^}=B*PRES=B));$ and $T=D;$ where C=Current picture pointer;
P=Past picture pointer;
F=Future picture pointer;
D=Display picture pointer;
T=Temporary pointer;
PRES=Present picture type;
PREV=Previous picture type; and
NBF=No B frame mode.

2. The digital video decoder of claim 1 wherein the three frame buffers are each large enough to hold a decoded frame.

3. The digital video decoder of claim 1 wherein a picture being displayed comes from either the past reference frame buffer for an I- or P- picture, or from the current frame buffer for a B- picture.

4. The digital video decoder of claim 1 wherein said decoder supports normal mode decoding and low delay mode decoding.

5. The digital video decoder of claim 4 wherein said decoder supports normal mode decoding and wherein said frame buffer memory is allocated at between 2 and 4 MBytes with an 8 byte data bus.

6. The digital video decoder of claim 4 wherein said decoder supports low mode decoding and said frame buffer memory is allocated at 1 MByte with a 4 byte data bus.

7. A method of decoding a digital video datastream in a digital video decoder comprising an input data buffer, a variable length decoder, a dequantizer, an inverse discrete cosine transform decoder, a motion compensator, and a frame memory, said frame memory having at least a past reference frame buffer, a future reference frame buffer, a frame buffer for a frame currently being decoded, and a Spill Buffer, said Spill Buffer being dynamically allocable within said frame memory as frames are decoded, and where said three frame buffers are accessed on a rotating basis according to the following algorithm:

$C=D*NBF+\text{^}NBF*(T*(PREV\text{^}=B)+P*(PREV=B*PRES\text{^}=B));$ $P=C*NBF+\text{^}NBF*F*(PRES\text{^}=B);$ $F=T*(PREV\text{^}=B*PRES=\text{^}B)+P*(PREV=B*PRES\text{^}=B);$ $D=C*NBF+\text{^}NBF*(F*(PRES\text{^}=B)+T*(PREV\text{^}=B*PRES=B));$ and $T=D;$ where C=Current picture pointer;
P=Past picture pointer;
F=Future picture pointer;
D=Display picture pointer;
T=Temporary pointer;
PRES=Present picture type;
PREV=Previous picture type; and
NBF=No B frame mode;

which method comprises:

a. storing a frame currently being decoded in the current frame buffer;
b. storing a past reference frame in the past reference frame buffer; and
c. storing a future reference frame in the future reference frame buffer.

8. The method of claim 7 comprising storing a complete frame in each of said frame buffers.

9. The method of claim 7 wherein a picture being displayed comes from either the past reference frame buffer for an I- or P- picture, or from the current frame buffer for a B- picture.

10. The method of claim 7 comprising assigning the Spill Buffer dynamically while decoding a picture.

11. The method of claim 10 comprising dynamically assigning the Spill Buffer to one of the three frame buffers.

12. The method of claim 7 further comprising seamless sequence switching.

* * * * *